UNITED STATES PATENT OFFICE.

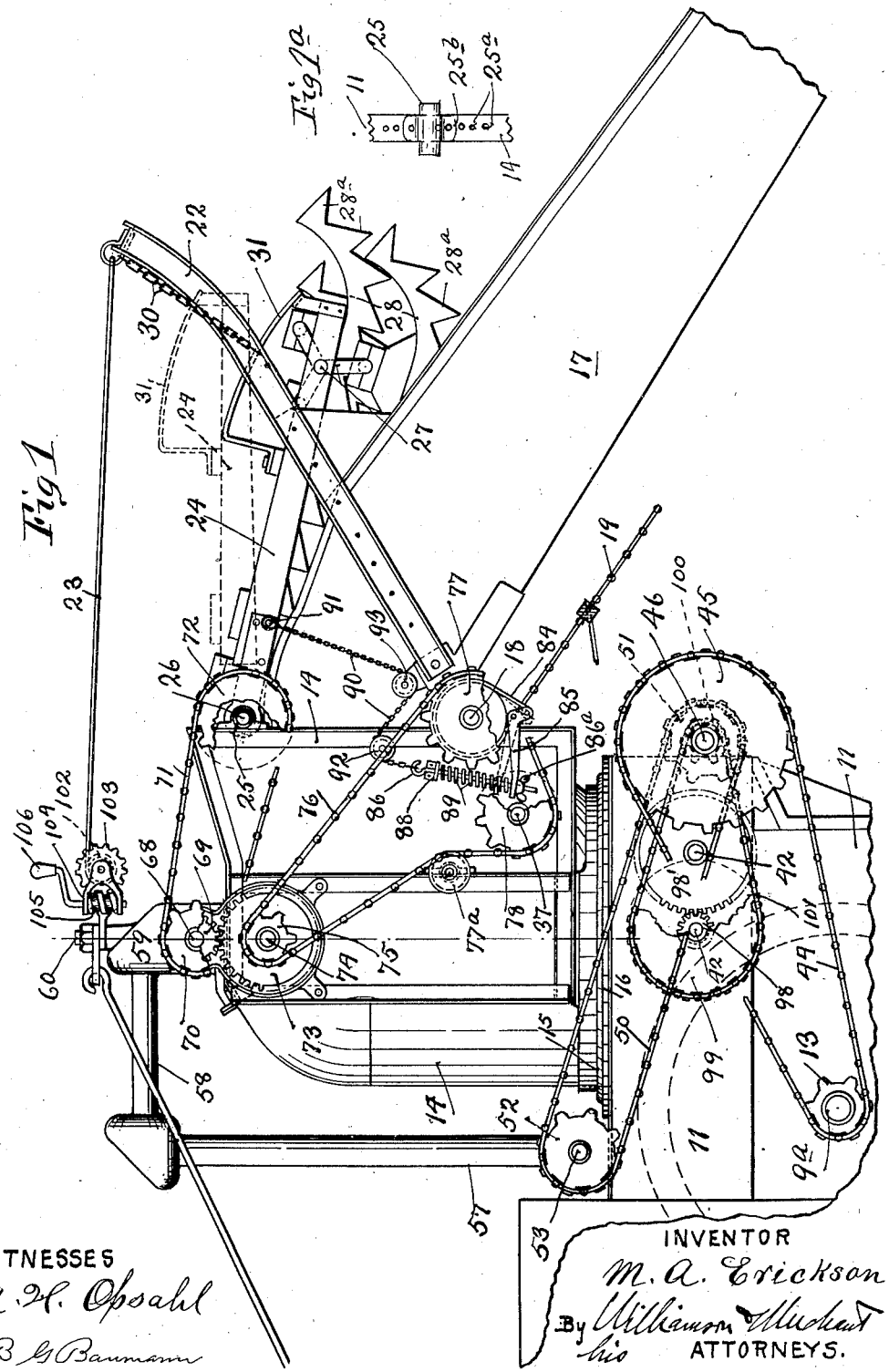

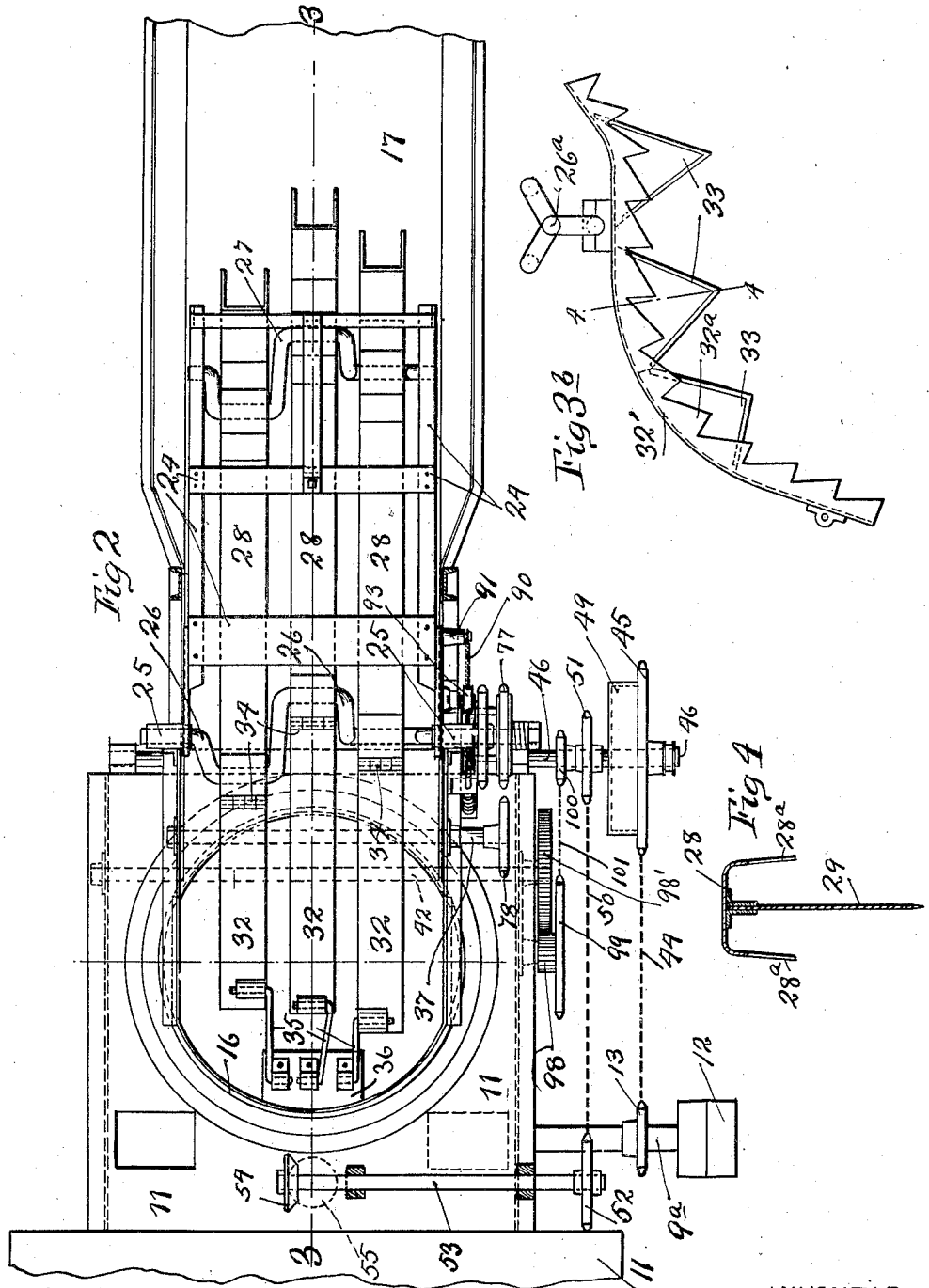

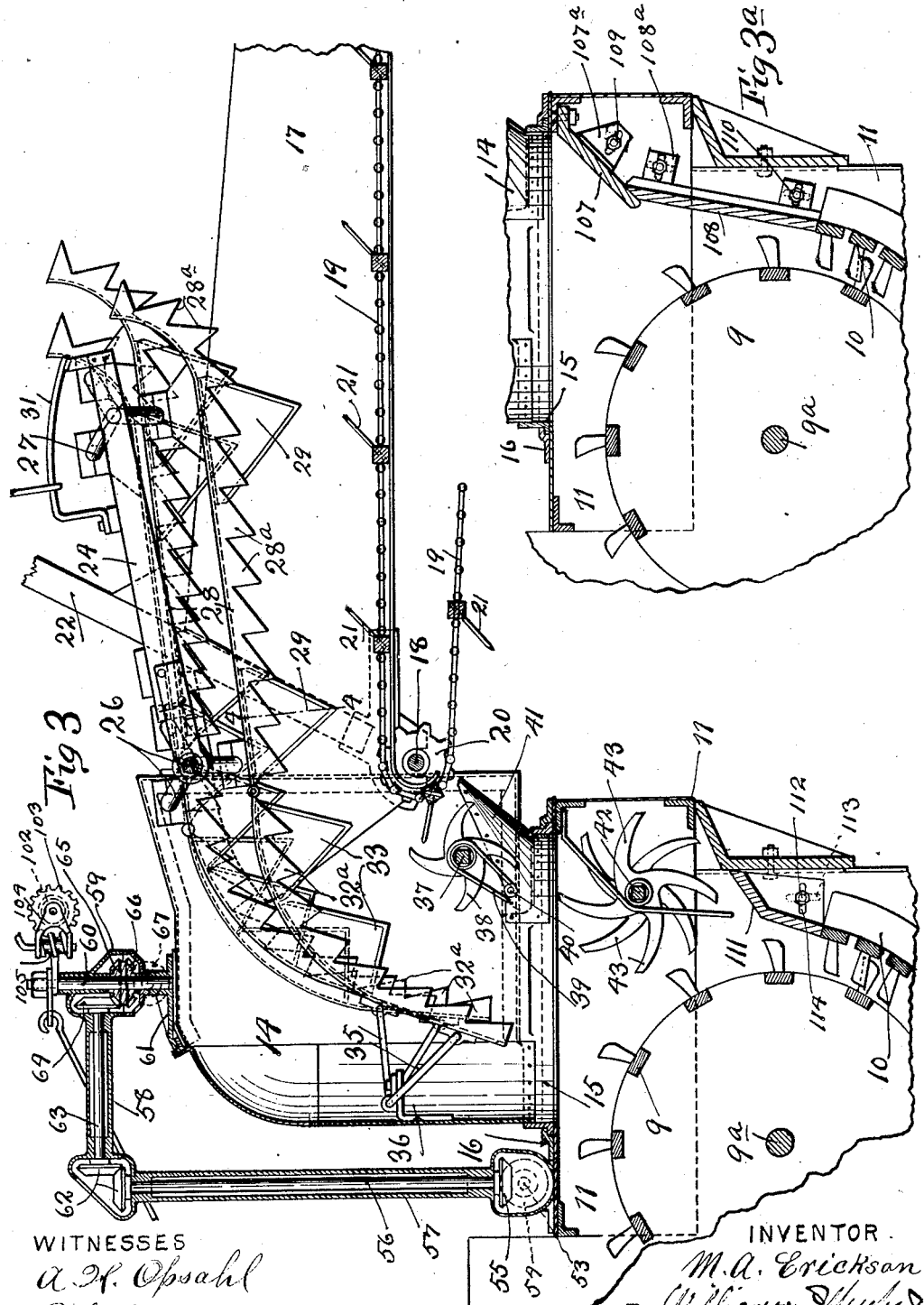

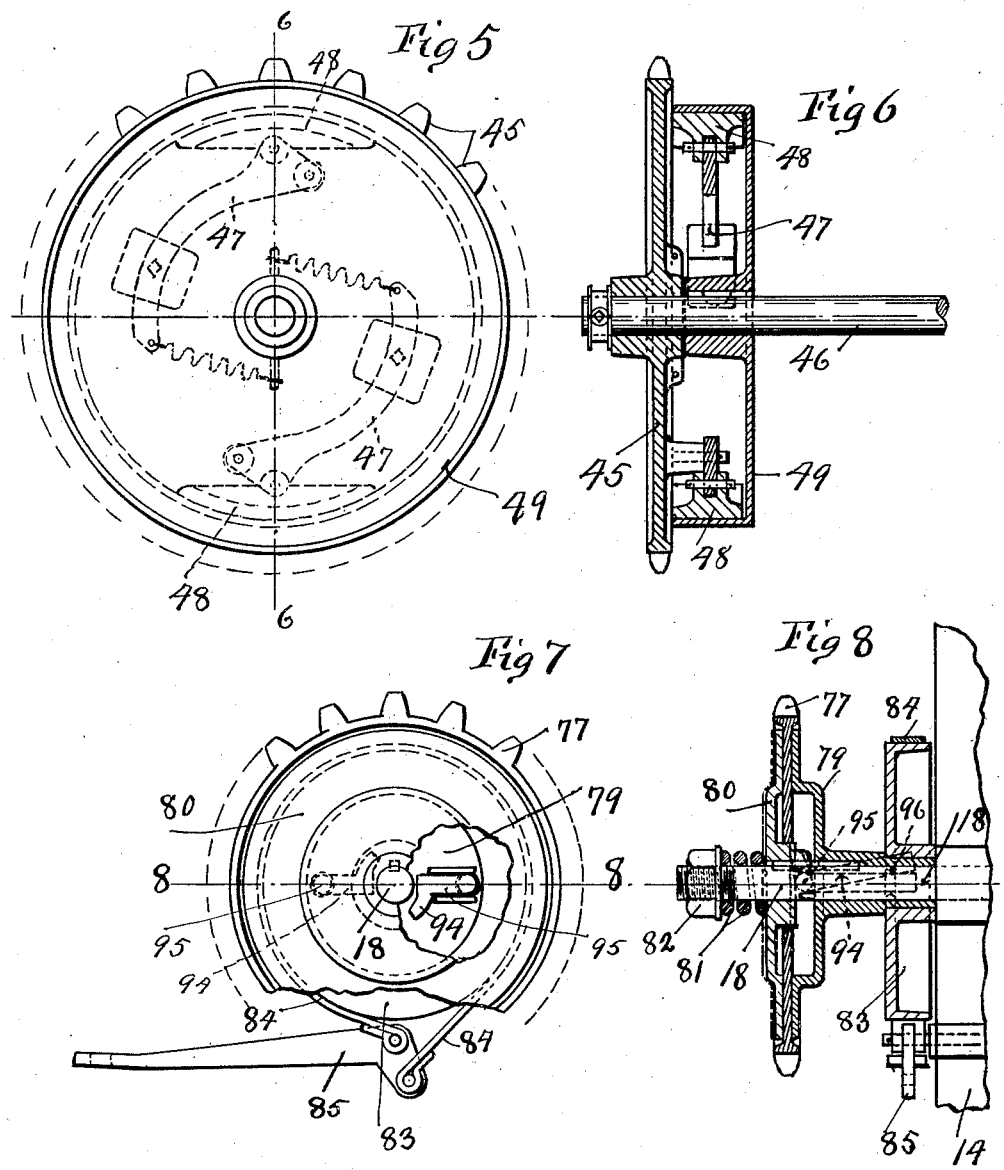

MARCUS A. ERICKSON, OF MINNEAPOLIS, MINNESOTA, ASSIGNOR TO TWIN CITY FEEDER MANUFACTURING COMPANY, OF MINNEAPOLIS, MINNESOTA, A CORPORATION OF MINNESOTA.

BAND-CUTTER AND FEEDER.

1,367,738.   Specification of Letters Patent.   Patented Feb. 8, 1921.

Application filed November 14, 1918. Serial No. 262,455.

*To all whom it may concern:*

Be it known that I, MARCUS A. ERICKSON, a citizen of the United States, residing at Minneapolis, in the county of Hennepin and State of Minnesota, have invented certain new and useful Improvements in Band-Cutters and Feeders; and I do hereby declare the following to be a full, clear, and exact description of the invention, such as will enable others skilled in the art to which it appertains to make and use the same.

My invention relates to band cutters and feeders for threshing machines and involves certain new and highly important features whereby greatly improved results are obtained in the band cutting and feeding actions, as will be hereinafter pointed out and defined in the claims.

The improved features herein disclosed and claimed are applicable, both to single wing and hood structures and to double or duplex wing and hood structures, but in the drawings, they are shown as incorporated in a band cutter and feeder of the single wing and hood type.

Generally stated, the invention consists of the novel devices and combination of devices, hereinafter described and defined in the claims.

The various novel features are illustrated in the drawings and hereafter described.

In the drawings, like characters indicate like parts throughout the several views. Referring to the drawings;

Figure 1 is a side elevation showing a portion of the threshing machine and my improved band cutter and feeder applied thereto, some parts being broken away;

Fig. 1ª is a detail of a bearing shown in Fig. 1.

Fig. 2 is a plan view of certain of the parts shown in Fig. 1, but with the hood and certain other parts removed;

Fig. 3 is a vertical section taken approximately on the line 3—3 of Fig. 2;

Fig. 3ª is a fragmentary view on the same section line as Fig. 3 but illustrating a modified form of the feed boards which direct the grain to the threshing cylinder and concave;

Fig. 3ᵇ is a detail in side elevation illustrating a modified form of a tedder bar;

Fig. 4 is an enlarged detail in section through one of the tedder bars on the line 4—4 of Fig. 3;

Fig. 5 is a detail in side elevation showing an automatic clutch used in the transmission mechanism throwing the entire mechanism of the band cutter and feeder into action only when the threshing cylinder has been driven in what may be designated as an operative speed, and conversely, in throwing said mechanism out of action when the speed of the threshing cylinder is decreased below such operative speed;

Fig. 6 is a section on the line 6—6 of Fig. 5;

Fig. 7 is a side elevation with some parts broken away showing an automatic bearing and clutch mechanism for controlling the feed belt of the bundle conveyer; and Fig. 8 is a section taken on the line 8—8 of Fig. 7.

Of the parts of the threshing machine proper, the numeral 9 indicates the threshing cylinder, the numeral 10 the coöperating concave and the numeral 11 that portion of the casing of the threshing machine in which the said cylinder and concave are mounted and work in the customary way. The shaft 9ª of the threshing cylinder, at one projecting end, is provided with the usual driving pulley 12 but is further provided with a driving sprocket 13.

A suitable hood 14, preferably made of sheet metal properly reinforced, is open at its bottom and secured to a flanged ring 15 that works in a horizontal retaining ring 16 secured on the top of the case 11, the latter having an opening in its top of the full diameter of the interior of the ring 15, so as to properly admit the unthreshed grain, end downward, to the threshing cylinder and concave. The hood is thus mounted for horizontal swinging movements on a vertical axis, and at its outer side, this hood is extended and opened.

The trough 17 of the bundle conveyer is pivoted for vertical adjustments on or concentric to the axis of the transverse shaft 18 that is mounted in suitable bearings on the sides of the hood 14 and extends transversely across the lower portion of the open side thereof. The chains of the slat and belt conveyer 19 run over sprockets 20 on shaft 18 and over coöperating sprockets, not shown, which, as is customary, would be located at the free end of the top. This conveyer belt, of course, runs over and under the bottom of the trough 17 in a direction longitudinally thereof, this being the customary arrangement. As shown, the cross slats of the belt 19 have backwardly inclined teeth 21 which assist in the feeding action of the bundles.

At its pivot or inner end, the conveyer trough 17 is provided with an upwardly extended rigidly secured arm, preferably in the form of a yoke 22, and this yoke, at its free end, is connected to a lifting cable 23, operated by a suitably supported windlass, the illustrated arrangement of which will be hereinafter described, it being sufficient at this point to state that by winding up and letting out the cable 23, the bundle conveyer made up of trough 17 and belt 19, may be raised and lowered with the pivot on the axis of the shaft 18.

The so-called tedder frame 24 is shown as made up of laterally spaced bars and cross bar connections, and the said laterally spaced bars, at their inner ends (see Figs. 2 and 3) are pivoted on bearing sleeves 25 adjustably secured to the upper portions of the sides of the hood 14. A crank shaft 26 is journaled in the bearing sleeves 25 and a similar crank shaft 27 is journaled in the free ends of the side bars of the frame 24. These crank shafts 26 and 27 have multiple cranks, the said cranks on the two shafts being duplicates in character and the cranks on each shaft being set, the one ahead of the other. The tedder bars of which, as shown, there are three, are hung on the alined cranks of the two shafts 26 and 27. As shown, these tedder bars 28 are made of sheet metal, are channel-shaped in cross section and are provided with depending saw-like teeth 28ª that greatly assist in propelling the bundles and the straw of the cut bundles forward, or toward the hood. On their under sides, the tedder bars 28 are provided with rigidly secured depending V-shaped knife blades 29 that work above the delivery portion of the conveyer belt 19. The free end of the tedder frame is supported from the extended portion of the yoke 22 by means of a cable 30 which, as shown, is attached at its lower end to a yoke 31 secured on top of the free portion of said tedder frame. The free or extended end of the tedder frame is therefore limited in its downward movement, in respect to the underlying conveyer trough 17 and is normally held a predetermined distance above said trough, being carried vertically therewith when the said trough is adjusted, but, nevertheless, the said tedder frame is free to raise, in respect to the trough, an accumulation of bundles, as will hereinafter more fully appear.

By the tedder bars and knives described, the bands of the bundles will be cut under ordinary conditions and the cut bundles will be fed from the bundle conveyer into the hood, but to further insure these actions, I provide so-called auxiliary tedder bars best shown in Fig. 2 and 3. These tedder bars 32 are longitudinally curved, are preferably made up of sheet metal bent into channel-shaped form and provided with saw-like teeth 32ª and with V-shaped secondary cutting knives 33. At their upper ends, the auxiliary bars are pivotally connected to the inner ends of the main tedder bars 28 preferably by hinges 34, and at their lower ends are pivotally connected to links 35 which, in turn, are pivoted to a bracket 36 on the back of the hood 14.

As shown in Fig. 3, a retarding device is arranged to rotate in the hood in position to act upon the stock as it passes through the hood. This retarding device comprises a rotary shaft 37 mounted in the sides of the hood and provided with projecting teeth 38. The numeral 39 indicates small stripper bands which extend over the hubs on the shaft 37 and over a small rod 40, also supported in the sides of the hood 14. The numeral 41 indicates an upper flange secured to the ring 15 and extended under the retarding device just described. Said retarding device is rotated in an anti-clockwise direction in respect to Fig. 3.

Here it may be further noted that shaft 18 is also rotated in an anti-clockwise direction, in respect to Fig. 3, while the crank shaft 26, and hence, also the crank shafts 27 are rotated in a clockwise direction.

In the construction illustrated in Fig. 3, a second retarding device of substantially the same character as that above described, but preferably larger, is mounted in the upper front portion of the casing 11 for action on the straw as it passes directly to the threshing cylinder. This retarding device comprises a shaft 42 having projecting fingers 43, said shaft being journaled in the sides of the casing. The mechanism for driving the several movable parts already described and including the automatic clutch devices already noted, will now be considered.

A sprocket chain 44 runs over sprocket 13 on the cylinder shaft 9ª and over a larger sprocket 45 that is normally loose on a transverse counter shaft 46 journaled in suitable bearings on the front of the case 11. When the threshing cylinder reaches an operative speed, sprocket 45 will be connected to shaft 46 by an automatic clutch device already referred to. This clutch device comprises spring retracted weighted arms 47 pivoted to sprocket 45 and having shoes 48 operative on the interior of the clutch drum 49, the hub of which is keyed to shaft 46 (see Figs. 5 and 6).

A sprocket chain 50 runs over a sprocket 51 on the shaft 46 and over a sprocket 52 on a counter shaft 53 journaled in suitable bearings on the top of case 11 and provided at its inner end with a miter gear 54. Miter gear 54 engages a miter gear 55 on the lower end of an upright shaft 56 carried in a tubular column 57 rigidly supported on top of the case 11. At its upper end, the tubular column 57 has a tubular horizontal extension 58 that terminates in a fixed gear housing 59 to which is pivoted a long vertical stud 60, that is rigidly secured at its lower end to a bracket 61, which, in turn, is rigidly secured to the top of the hood 14. The stud 60 is in axial alinement with the pivotal axis of the hood. Shaft 56, at its upper end, is connected by a pair of miter gears 62 to a horizontal shaft 63 journaled in the tubular arm 58, and provided at its front end with a miter gear 64 (see Fig. 3). Miter gear 64 meshes with a miter gear 65 that is loosely journaled on the stud 60 with its back rigidly secured to a reversely facing miter gear 66. Miter gear 66 meshes with a miter gear 67 indicated by dotted lines in Fig. 3. Said miter gear 67 is connected to the inner end of a short shaft 68 (see Fig. 1), journaled in the sides of the bracket 61 and provided at its outer end with a spur pinion 69 and a sprocket 70.

Sprocket chain 71 runs over sprocket 70 and over a sprocket 72, which latter is secured on one projecting end of the crank shaft 26.

I have now described the driving connections for operating the tedder bars, being, of course, evident that rotation of the crank shaft 26, acts through the tedder bars themselves to produce a synchronous action of the two crank shafts 26 and 27 and will impart parallel gyratory movements to the several tedder bars bringing the said tedder bars into action in succession on the bundles.

The spur pinion 69 on shaft 68 meshes with the spur gear 73, which is a complete gear, the teeth thereof being shown only in part in Fig. 1. This gear 73 is journaled on a stud 74 projected from one side of a hood and on its hub carries a sprocket 75. A sprocket chain 76 runs over sprocket 75, over a sprocket 77 on the projecting end of counter shaft 18, under a sprocket 78 on the projecting end of shaft 37 and over an idle chain tightening wheel 77ª that is also journaled to the side of the hood 14.

Sprocket 78 is rigid on shaft 37 so that the upper retarding device 38 is given positive rotation from the chain 36. Sprocket 77, however, is primarily loose on conveyer shaft 18, but is normally caused to rotate therewith by a friction clutch, the preferred arrangement of which is illustrated in detail in Figs. 7 and 8 and is associated with a friction brake in a novel and important combination, towit, the numerals 79 and 80 indicate clutch disks, both keyed for rotation with shaft 18, the former being rigid thereon and the latter having sliding movement. The web of sprocket 77 is frictionally pressed between the disks 79 and 80 and, as shown, is rotatively mounted on the hub of the latter. The numeral 81 indicates a coiled spring which is compressed between the disk 80 and an adjustable nut 82 on the threaded end of shaft 18. Normally, spring 81 causes the clutch disks 79 and 80 to tightly press the web of sprocket 73 so that said sprocket, when rotated, will cause disks 79 and 80, and hence shaft 18, to rotate therewith. Of course, when shaft 18 is rotated, conveyer belt 19 will be driven, this being the action which takes place when the machine is in action, and there is not an overaccumulation of bundles on the conveyer.

When there is an over accumulation of bundles in the conveyer, it is important, first, that the bundle conveying belt be thrown out of action, and second, that the said belt be secured against movement, both under the action of momentum and under the forward pull produced thereon by the feeding of the cut bundles from the delivery portion thereof by the overhead acting tedder bars. This I accomplish by providing a stop device, preferably in the form of a friction brake which is brought into action simultaneously, or approximately so, with the uncoupling of shaft 18 from sprocket 77. This friction brake involves a friction drum 83 secured to shaft 18 being, as shown, directly secured on the reduced hub of friction wheel 79. A brake band 84, surrounds the drum 83, the ends thereof being attached at different points to a band tightening lever 85. A draw bolt 86 is passed through a hole in the end of lever 85 and below said lever is provided with an adjustable nut 87. Bolt 86 works through a perforated bracket 88 on the sides of the hood.

(see Fig. 1) and a coiled spring 89 which surrounds bolt 86, is compressed between bracket 88 and lever 85.

A cable shown in the form of a chain 90 is attached to the upper end of bolt 86 and is extended to and attached to the intermediate portion of one of the longitudinal bars of the floating tedder frame 24, being, as shown, directly attached to a boss 91 on the said bar. The cable 90 also runs over guide wheels 92 and 93, the former of which is journaled to the side of the hood 14 and the latter of which is journaled to a lock on one side of the yoke 22 which, it will be remembered, is attached to and moves with the conveyer trough 17. These idle wheels 92 and 93 constitute the cable play take-up device referred to in the earlier part of this description.

The relative arrangement is such that, as the trough 17 is raised, carrying with it the tedder frame 24, wheel 93 will move in a direction to permit the cable 90 to assume a more nearly straight line, and thus to leave the draw bolt 86 and spring 89 not materially effected by such movement. The general results thus accomplished are of the utmost importance, because, for all practical purposes, it would be impossible to utilize vertical movements of the tedder frame 24 in respect to the trough 17, produced by accumulation of bundles, as a means for tripping the conveyer belt out of action and setting the brake therefor, if simultaneous vertical adjustments of the trough and tedder bar frame or support were permitted to throw the clutch and brake cranks described into or out of action. Otherwise stated, it must be a predetermined vertical movement of the tedder bar frame or support, not in respect to the ground, but in respect to the bundle feeding trough or bundle feeding device that serves to operate the brake and clutch.

As a simple means for releasing sprocket 77 from clutch disks 79 and 80, I provide bell crank trips 94 which are carried by the disk 79 and are pivoted thereto at 95. The short arm of these bell crank trips bear against the hub of disk 80 and the long arm thereof extends through an opening in disk 79 along the outer side of the hub thereof and at their free ends extends through a perforation 96 formed in the brake drum 83 just outside of this hub (see Figs. 7 and 8).

With this arrangement, when the brake band 84 is loosened on the periphery of the drum 83, the spring 81 will hold disks 79 and 80 clamped on the web of the sprocket 77 and the said parts 77, 79, 80 and the drum 83 will rotate in unison. When, however, the brake band 84 is set on the drum 83, the said drum will be caused to lag back as far as permitted by the long arms of the bell cranks 94, and this lagging back of the drum will rock the bell cranks far enough to cause the short arms thereof to press clutch disk 80 away from the web of sprocket 77 to thus release the said sprocket so that the sprocket may continue to run while the further movements of drum 83, disks 79 and 80, shaft 18 and conveyer belt 19 will be temporarily locked against movement.

Here it may be stated more or less specifically than heretofore, that the brake band 84 will be set, as above just stated, whenever, by an over accumulation of bundles on the conveyer, the tedder frame 24 is raised, in respect to the conveyer trough 17, so as to thereby pull on the cable 19, overcoming the spring 89 and moving the brake lever 85. Of course, when the tedder frame 24 again drops back down to its normal position in respect to the trough 17, the brake will be released, the continually running sprocket 77 will be again clutched to shaft 18 and the conveyer belt 19 will be thrown into action.

Means have now been described for driving all of the running parts of the mechanism, except the retarding device 43, and this latter means, as shown, involves a spur gear 98' on the end of shaft 42, a spur pinion 98 journaled to the sides of the casing 11 and meshing with gear 98', a sprocket 99 secured to one side of pinion 98, a sprocket 100 on shaft 46 and a sprocket chain 101 running over said sprocket 100.

Referring now to Figs. 1 and 3, it will be noted that the heretofore described conveyer lifting cable 23 is attached to a windlass drum 102, the shaft of which is provided with a worm gear 103 and is journaled in a yoke 104 that is anchored to the upper end of the stud 60. Mounted in the yoke 104 is a worm 105 that meshes with the worm gear 103 and is provided with an operating crank 106, by means of which, said worm may be rotated in the one direction. To wind up cable 23 and raise the conveyer trough, or in the other direction to let out said cable and lower said trough. The said worm and gear will, of course, automatically lock the conveyer trough in any vertical adjustment in which it may be set; and inasmuch as brake 104 is pivoted on the axial stud 60, it is evident that lateral oscillatory movements of the bundle conveying trough and hood, permitted by the swiveling of the ring 15 within the retaining ring 16, will not change the vertical adjustments of said trough.

The bearing sleeves 25 on which the tedder frame 24 is pivoted are preferably made vertically adjustable, so as to vary the height of the normal passage between the delivery portions of the conveyer belt 19 and the tedder bars; and such adjustments require corresponding adjustments of the nut 87 on the draw bolt 86. As shown, said sleeves 25 are provided with perforated ears (see particularly Fig. 1ª), through which, and vertically spaced perforations 25ª in upright hinge bars of the hood 14, suitable bolts or screws 25ᵇ are passed to provide for the above noted adjustment of the tedder bar frame. In Fig. 3, the feed board 111 is made adjustable by nut-equipped bolts 112 that work in intersecting slots 113 and 114, respectively, in the sides of the case 11 and in end flanges of said feed board.

Fig. 3ª shows a modified construction in which the lower retarding device 42—43 is dispensed with and in which coöperating feed boards 107 and 108, are adjustably connected to the sides of the casing 11 by means of sliding brackets 107ª and 108ª, respectively, and coöperating nut-equipped clamping bolts 109 and 110.

Fig. 3ᵇ illustrates a somewhat modified form of supplemental tedder bar 32′ which may be guided at its lower end by any suitable means, such as herebefore described links 35 and which, at its upper end, is operated by a single crank shaft 26ª.

*Summary of operation.*

The operation, in most of its aspects, has already been clearly described, but briefly summed up is as follows:

The conveyer trough is capable of vertical and lateral adjustments without changing the coöperative relation thereof, in respect to the tedder bars and its supporting frame. Under normal or proper supply of bundles, the conveyer belt 19 and the tedder bars will all continue in action; and the bands of the bundles will be cut in almost every instance by knives that overlie the conveyer belt and while the bundles are still on the conveyer belt. The tedder bars are driven at such speeds that they will tend to feed the cut grain off from the tops of the bundles and will rake the same downward through the hood and to the threshing cylinder and concave. If any band should escape being cut while the bundle is on the conveyer belt, it will certainly be cut by one of the knives 33 of the auxiliary tedder bars 32 as it passes over the retarder 38. The chief function of these auxiliary tedder bars, however, is to properly turn the grain downward through the hood and further spread and insure the proper delivery thereof to the threshing cylinder. The several tedder bars, of course, will produce their feeding actions in regular order and, at least one thereof, is always in action on the grain or straw.

When there is an over accumulation of bundles, such as would be likely to choke up the feeder or the threshing cylinder, they will raise the tedder frame on its pivot in respect to the feed belt and in respect to the bottom of the feed trough, and such relative vertical movements of the said tedder frame 24, acting through the cable 90, will trip the conveyer belt 19 out of action and cause it to be frictionally locked in a stopping position, as already clearly described. When the conveyer belt is thus stopped and locked, its teeth 21 will positively hold back the lower bundles or the lower portion of the cut bundles, while the tedder bars continue their action on top of the accumulated grain, will feed off the upper portion and direct the same to the threshing cylinder until the pull or accumulation has been restored to normal, whereupon the frame 24 will lower, in respect to the trough, and the conveyer belt 19 will be again caused to resume its normal feeding action.

The mechanism herein referred to as a "compensating device" whereby the tripping action is self-adjustable to different positions of the bundle feeding device in respect to the ground, is best shown in Fig. 1, and as shown, consists of the chain or cable 90, the sheaves 92 and 93 and the spring connection 88—89; and it will be observed that the relation of these parts is such that the slack of the chain will not be varied when the carrier frame is raised and lowered, carrying with it the tedder supporting frame. Also, it will be noted that the tedder frame is arranged to rise and fall with the bundle conveyer and its frame.

What I claim is:

1. In a band cutter and feeder, the combination with a pivoted bundle conveyer, of a pivoted feed and band cutting device consisting of tedder bars with teeth and knives thereon, an arm connected with said conveyer, means connected with said arm for raising and lowering said conveyer, and a yielding connection supporting the outer portions of said tedder bars from said arm.

2. In a band cutter and feeder, the combination with a pivoted bundle conveyer, of a pivoted feed and band cutting device consisting of tedder bars with teeth and knives thereon, a yoke connected with said conveyer, means connected with said yoke for raising and lowering said conveyer, and a flexible connection supporting the outer portions of said tedder bars from said yoke.

3. In a band cutter and feeder, the combination with a pivoted bundle conveyer, of a pivoted feed and band cutting device, means connected with said conveyer and said feed and band cutting device for simultaneously either raising or lowering the outer ends of each thereof, said means including a flexible connection between said conveyer and said feed and band cutting device, and flexible means for normally holding the feed and band cutting device in its lowest position relative to said conveyer.

4. In a band cutter and feeder, the combination with a conveyer trough and a coöperating bundle conveyer, of an overhead feed device pivotally mounted at its inner end with freedom for rising and falling movements in respect to said trough, at its outer or receiving end, the said trough, bundle conveyer, and overhead feed device being capable of simultaneous vertical movements, means for driving said overhead feed device, means for driving said bundle conveyer, a tripping connection for throwing said latter driving means temporarily out of action when the said overhead feed device is raised to a predetermined extent above said bundle conveyer, the said tripping connection including a compensating device whereby the tripping connection is self adjusted to different positions of said bundle feeding device in respect to the ground.

In testimony whereof I affix my signature in presence of two witnesses.

MARCUS A. ERICKSON.

Witnesses:
 Eva E. König,
 Harry D. Kilgore.